J. P. SIMMONS.
Coffee Roaster.
No. 23,867.
Patented May 3, 1859.
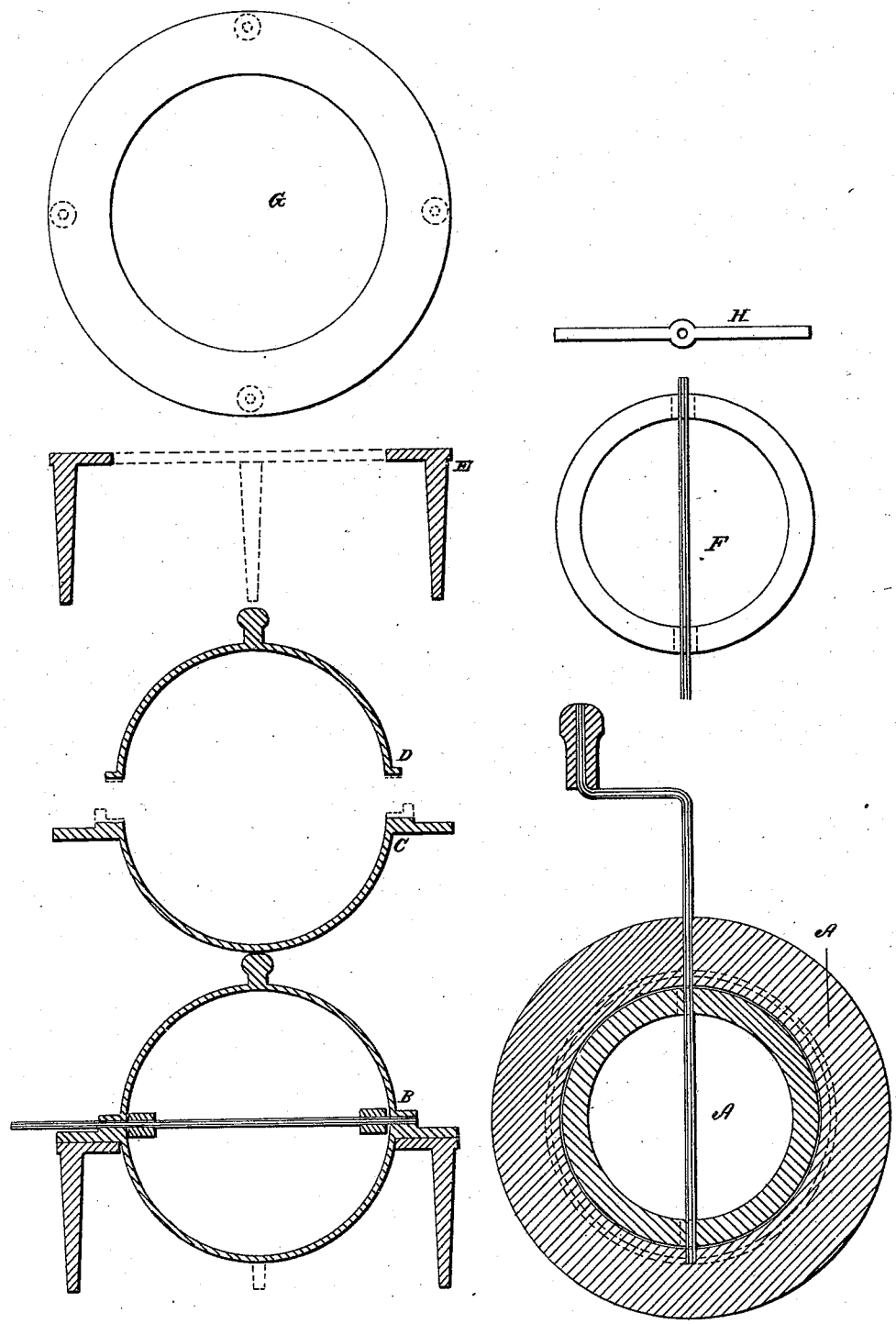

UNITED STATES PATENT OFFICE.

J. P. SIMMONS, OF BALDWINSVILLE, NEW YORK.

COFFEE-ROASTER.

Specification of Letters Patent No. 23,867, dated May 3, 1859.

*To all whom it may concern:*

Be it known that I, JONATHAN P. SIMMONS, of Baldwinsville, county of Onondaga, and State of New York, have invented a new and Improved Utensil for Roasting Coffee; and I do hereby declare that the following is a full and exact description thereof, reference being had to the accompanying drawings, making part of this specification, wherein—

The figure marked A, represents a central, horizontal section of the coffee roaster, showing the lower half of the spherical case, and a side view of the flat, revolving ring, with the handle by which it is turned; and the figure marked B, represents a central, vertical section of all the parts composing the utensil, in place, comprising the above-named lower half of the spherical case, the revolving ring (in transverse section) with the shaft on which it turns, the upper half of the spherical case, and a stand, or stove aperture in which the coffee roaster is to be placed, when using; C, a central vertical section of the lower half of the spherical case; D, a similar view of the upper half, or part of the case; E, a similar section of the stand, or stove aperture, to receive the roaster; F, a plan of the flat ring, with its shaft; G, a plan of the stand, or stove aperture, to receive the roaster; and H, an edge view of the revolving ring, in the line of its axis or shaft.

I construct the case in the form of two hemi-spherical parts C, and D, the former or lower one being provided with a suitable flange by which it may rest on the stove, or stand, when placed over the fire, and also with bearings to receive the shaft of the revolving ring, and with a groove, or other suitable arrangement, for receiving the upper half D, which fits closely down upon said lower half and shuts all tightly in as a cover.

The ring F, H, is made in the form of a flat ring, substantially as represented, its outer periphery being nearly equal in diameter to the inside of the spherical case, so that it may turn freely therein, but sweep closely to the inner surface thereof; and the breadth of the band, forming the ring, varies with the size of the roaster, but may be in about the same proportion to the size of the other parts as shown in the drawings. It is secured to its shaft in the manner represented, so that it may be turned sidewise within the spherical case, each half of its periphery thus sweeping closely within the entire inner surface of the case, at each revolution.

The utensil being constructed substantially as above described, the coffee is placed therein, and the case set over a suitable fire. The handle of the ring is slowly or occasionally turned; and the effect of the rings' revolutions is, each time, to sweep all the grains of coffee which lie in contact with the surface of the case, away therefrom, raise them, and drop them upon the upper surface of the mass of coffee, thereby, constantly and uniformly, removing those most exposed to the heat to where they are least exposed; and this in equal and exact succession. The efficacy of this operation cannot be surpassed. By it, the coffee is roasted with perfect uniformity, without the danger of scorching, if ordinary attention is directed to the process, to see that it is not carried too far. Another advantage is, that the peculiar construction of the case retains the volatilized aroma, therein, while the ring, constantly sweeping alternately through the upper and lower half of the case, is continually returning the aroma to, and among, the grains of coffee, thus, if not causing a re-absorption thereof, at least preventing a large continued waste therefrom.

What I claim as my invention and desire to secure by Letters Patent, is—

The combination of the revolving ring with the spherical case, constructed, arranged, and operating substantially as herein specified.

JONATHAN P. SIMMONS.

Witnesses:
   J. E. MUNGER,
   S. C. ROBINSON.